United States Patent [19]

Johnson

[11] Patent Number: 4,569,195
[45] Date of Patent: Feb. 11, 1986

[54] FLUID INJECTION GAS TURBINE ENGINE AND METHOD FOR OPERATING

[75] Inventor: Kenneth O. Johnson, Cincinnati, Ohio

[73] Assignee: General Electric Company, Cincinnati, Ohio

[21] Appl. No.: 604,670

[22] Filed: Apr. 27, 1984

[51] Int. Cl.[4] ............................ F02C 7/00; F02C 9/16
[52] U.S. Cl. ................................ 60/39.3; 60/39.05
[58] Field of Search .................. 60/39.05, 39.3, 39.53, 60/39.54, 39.55, 39.58, 39.59

[56] References Cited

U.S. PATENT DOCUMENTS

| | | | |
|---|---|---|---|
| 2,678,531 | 4/1984 | Miller | 60/39.53 |
| 3,021,673 | 2/1962 | Mock | 60/39.3 |
| 3,335,565 | 8/1967 | Aguet | 60/39.05 |
| 3,461,667 | 8/1969 | Aguet | 60/39.05 |
| 3,693,347 | 9/1972 | Kydd et al. | 60/39.05 |
| 3,729,930 | 5/1973 | Williams | 60/39.58 |
| 3,978,661 | 9/1976 | Cheng | 60/39.55 |
| 4,128,994 | 12/1978 | Cheng | 60/39.05 |
| 4,297,841 | 11/1981 | Cheng | 60/39.3 |

FOREIGN PATENT DOCUMENTS 918458 4/1982 U.S.S.R. ............................ 60/39.58

Primary Examiner—Louis J. Casaregola
Attorney, Agent, or Firm—Lee H. Sachs; Derek P. Lawrence

[57] ABSTRACT

A gas turbine including at least a compressor, a combustor, and a turbine is constructed to operate at a preferred thermal efficiency in predetermined compressor and turbine flow pressure ratios. A fluid, such as steam, for example produced by waste heat and pressurized as water, and characterized as having a higher specific heat at constant pressure than effluent from the combustor is introduced into such effluent to provide a turbine operating medium of improved potential to transfer energy downstream of the combustor. Such injection provides effective variable geometry to the system. This injection system maintains such pressure flow ratios substantially independent of engine power output.

12 Claims, 3 Drawing Figures

FLUID INJECTION GAS TURBINE ENGINE AND METHOD FOR OPERATING

This invention relates to gas turbine engines and, more particularly but not exclusively, to gas turbine engines into which is injected a fluid such as steam generated from heat created by the engine.

BACKGROUND OF THE INVENTION

Current gas turbine engines are used in a variety of applications including the powering of aircraft, marine craft, electrical generators, and pumps, among others. Generally, the gas turbine engine is designed or constructed to operate most efficiently in a predetermined compressor flow pressure ratio range and predetermined turbine flow pressure ratio range, the ranges being selected for so called "balanced operation" between the turbine and the compressor. Such balanced flow pressure ratios are determined from the intended engine application and the engine power output range for such application.

Because such an engine does not always operate at a single power output, the balance between the compressor and turbine can be expanded over a broader range through use of mechanically variable geometry engine components such as variable inlet vanes, variable fan blades, variable compressor blading, variable exhaust nozzles, etc, in selected combinations. Such mechanically variable components are modulated by engine controls during operation to affect certain engine operating parameters in a preselected manner under different operating conditions. However, such mechanically variable components in the high temperature operating turbine portion of the engine can be difficult and costly to construct and maintain.

SUMMARY OF THE INVENTION

It is a principal object of the present invention to provide a gas turbine engine, and a method of engine operation, of preferred thermal efficiency over a wide power operating range.

Another object of the present invention is to provide such an engine which includes the substantial equivalent operation of mechanical variability in the turbine with substantially fixed configurations.

A further object is to provide a steam injection gas turbine engine capable of maintaining a preferred thermal efficiency range over a wide power output range through use of heat removed from the engine to increase the potential of the flow through the turbine to transfer heat and convert energy through the turbine.

These and other objects and advantages will be more fully understood from the following detailed description, the drawings, and the embodiments, all of which are intended to be typical of rather than in any way limiting on the scope of the present invention.

Briefly, the present invention in one form provides a gas turbine engine system which comprises, in operating series, a compressor, a combustor, and a turbine, the combustor generating a gaseous combustor effluent. The engine is constructed to operate at a preferred thermal efficiency in a predetermined compressor flow pressure ratio range and a predetermined turbine flow pressure ratio range. The engine system also includes a supply of fluid which is characterized by having a specific heat at constant pressure ($C_p$) greater than the $C_p$ of the combustor effluent. Included also is a fluid introduction means to introduce the fluid from the fluid supply into the engine, thereby to mix with the combustor effluent providing a turbine operating medium. The fluid introduction means is controlled by a system control means which modulates the introduction of fluid to provide the turbine operating medium with an energy transfer potential for a unit of flow, as a function of combined $C_p$ of the combustor effluent and the $C_p$ of the fluid at a selected position in the engine, greater than the energy transfer potential of an equivalent flow of the combustor effluent, as a function of the $C_p$ of the combustor effluent alone at such selected position, and to provide the flow pressure ratios of the compressor and the turbine in the predetermined range substantially independent of engine power output.

In a preferred embodiment, the fluid is steam, preferably superheated. Such steam can be generated from a water supply which is heated by extracting heat from various portions of the engine to convert the water to steam.

In the method for operating such a gas turbine engine, the engine is constructed to operate at a preferred thermal efficiency in a predetermined compressor flow pressure ratio range and a predetermined turbine flow pressure ratio range. Introduced into the engine is a fluid, the flow of which is modulated to maintain the compressor and turbine flow pressure ratios in their respective predetermined ranges substantially independent of engine power output.

DESCRIPTION OF THE PREFERRED EMBODIMENTS

Figure 1:
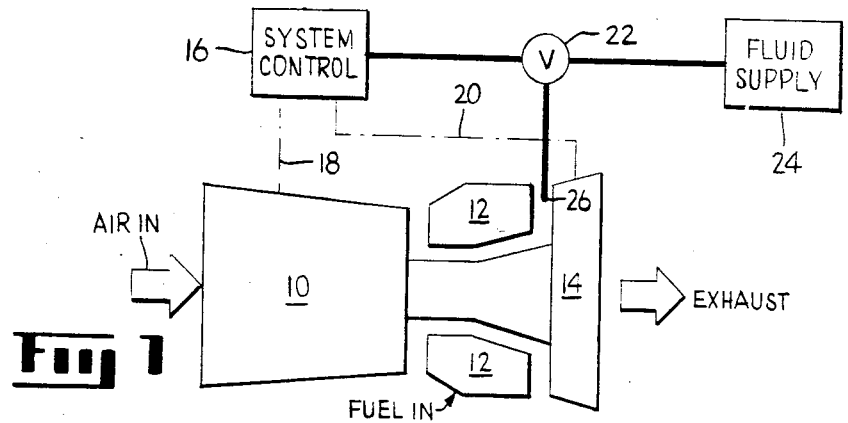
FIG. 1 is a diagrammatic view of one relatively simple form of the engine and system of the present invention.

Early gas turbine engines, first with centrifugal and later with axial flow compressors, along with a combustion section and a turbine section, were of a fixed geometry. They could operate relatively efficiently for their design at a preselected power output but were much less efficient under off-power conditions. As the gas turbine engine technology advanced, particularly in connection with aircraft applications, variable geometry configurations were introduced. First, these were in the exhaust and inlet portions of the engine and then elsewhere in the engine, more recently in the turbine nozzle. Generally, the variable geometry components were positioned during operation as a function of the engine power requirements and inlet ambient conditions, as is well known in the gas turbine engine art. As can be appreciated, the engine components required to provide such variable positioning are more expensive to manufacture, assemble, and maintain than are those of fixed position and geometry.

The present invention provides a gas turbine engine which can be of a fixed mechanical geometry, designed and constructed to operate at preferred thermal efficiency. Yet, the engine can have the capability of being operated at a variety of engine power output levels while maintaining such thermal efficiency. Also, the present invention can be useful in connection with existing engines which might include variable geometry components, enabling such engines to operate at preferred thermal efficiency with relatively little repositioning of the variable geometry components. According to the present invention, fluid such as steam is injected into the engine, typically at least into the turbine, in amounts which balance the flow pressure ratios of the turbine and its respective compressor in a predetermined range for such thermally efficient operation irrespective of engine power output.

The fluid which is injected into the engine for balancing of the operation of the turbine and compressor portions is one which has a specific heat at constant pressure ($C_p$) greater than that of the engine gas flow into which it is injected. In this way, the capability or potential of the resultant medium or mixture to transfer more heat away from parts being cooled and energy through the turbine is greater than that of the engine gas flow into which it is subjected. For example, the $C_p$ of air which includes some water vapor is equal to or greater than 0.24, whereas the $C_p$ of superheated steam is equal to or greater than 0.55, with a mixture or combination of the two varying the $C_p$ somewhere between those two values. Variation of such potential for the transfer of heat and energy per unit of flow through the turbine enables balancing of the turbine and compressor flow pressure ratios in a preferred range as engine power output varies or is selected.

Instead of opening or closing the variable geometry components such as inlet vanes, compressor vanes, turbine nozzle vanes, exhaust nozzle, or their combinations, the present invention provides an alternative. The injection of the above-described fluid is modulated by a system control as the control means. Such control is responsive to engine operating conditions such as, but not necessarily limited to, flow pressure ratios in the compressor and in the turbine. Modulation of such fluid injection accomplishes substantially the same result without changing the physical geometry of the flow-path, as by positioning of the components. It will be recognized that with the present invention, operation of the gas turbine engine can be maintained at a selected horsepower output, while varying the efficiency of operation at such point, using all available recoupe energy, even though it may be somewhat less than maximum. Therefore, as used herein the term "preferred thermal efficiency" may not always coincide with maximum thermal efficiency of the gas turbine engine.

FIG. 1 shows a relatively simple embodiment of the present invention. The gas turbine engine of the system shown comprises a compressor 10, a combustor 12, and a turbine 14, in operating series. As is well known in the art, compressor 10 receives and compresses air which then is introduced into the combustor where it is mixed with a fuel and ignited. The products of this combustion are introduced into and expanded through the turbine which is operatively connected to and drives the compressor. The gases exhausting from the turbine are then used to perform work, for example, operating a power turbine, providing the engine with thrust for propulsion purposes, etc, as is well known in the art.

According to the present invention, the relatively simple gas turbine engine included in FIG. 1 is modified into a system including a system control 16 which, using appropriately located probes and sensors of types well known in the art, senses operating parameters such as temperatures, pressures, and flow rates in the engine and particularly in compressor 10 and turbine 14 during operation. In FIG. 1, sensing of such parameters in compressor 10 and turbine 14 are shown respectively by lines 18 and 20. In the system of FIG. 1, such parameters include those values which identify the compressor flow pressure ratio range and the turbine flow pressure ratio range. The system control then compares such sensed parameters with predetermined values such as pressure ratio ranges which resulted from operation of the engine in a preferred thermal efficiency range. When system control 16 is given a command or determines a discrepancy between the sensed parameters and the preselected parameters, it operates valve 22 to control flow of fluid from fluid supply 24 into turbine 14 through fluid introduction means at 26, such as a nozzle, conduit, port, etc. until a desired balance of parameters such as flow pressure ratio ranges are established in compressor 10 and turbine 14. Such variation in parameters can result from a change in engine power output selection, for example, as controlled by the flow of fuel into combustor 12.

As was described above, the fluid from fluid supply 24, which is introduced through fluid introduction means 26 into turbine 14, has a specific heat at constant pressure ($C_p$) greater than the $C_p$ of the flow from the combustor, herein called combustor effluent, into the turbine. For example, superheated steam as the fluid can have a $C_p$ of more than 1.5 times the $C_p$ of an equivalent combustor effluent flow. The mixture of the fluid from fluid supply 24 with the combustor effluent results, as a function of the combined $C_p$ of the effluent and the $C_p$ of the fluid, in a turbine operating medium having the potential or capacity per unit of flow to transfer energy through the turbine greater than that of an equivalent flow of the combustor effluent. Furthermore, very little power is used to compress the added mass flow, for example, using a water pump. Under the influence of system control 16, the turbine flow pressure ratio range is maintained at that which provides a preselected component and overall thermal efficiency for the engine and, in turn, provides compressor 10 with the predetermined compressor flow pressure ratio range for which the engine has been designed to operate at a preferred thermal efficiency and/or power output.

Figure 2:
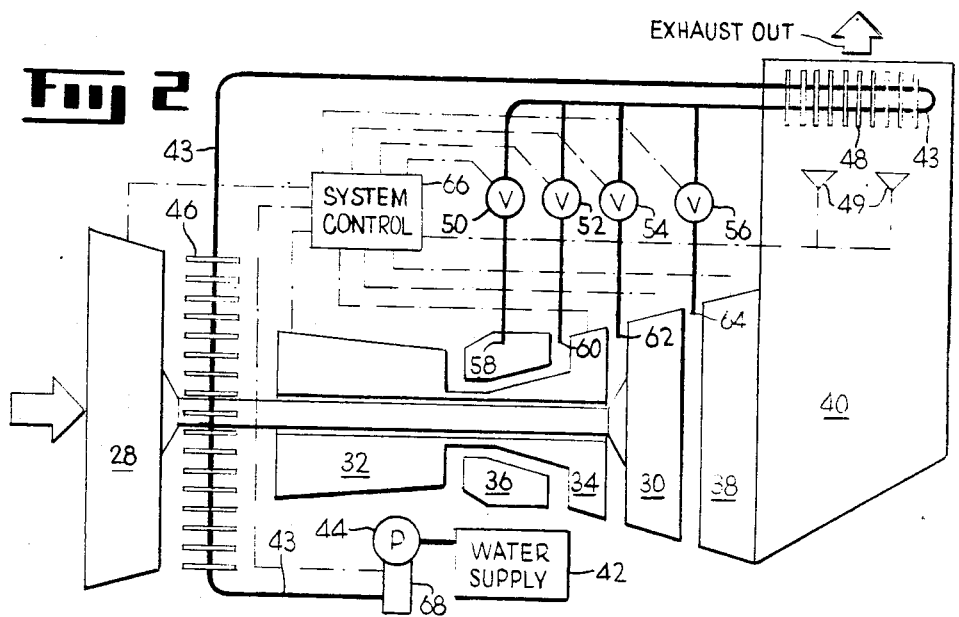
FIG. 2 is a diagrammatic view of a more complex form of the engine and system of the present invention.

As can be appreciated by those skilled in the art, the system presented in FIG. 1 is relatively simple compared with the more advanced systems or gas turbine engines presently in or planned for operation in vehicles for propulsion purposes or as power generators of various types. FIG. 2 presents a more complex embodiment of the present invention.

The system in FIG. 2 includes an engine having a low pressure compressor 28 connected with and driven by a low pressure turbine 30 and high pressure compressor 32 connected with and driven by high pressure turbine 34, in the operating series shown in FIG. 2. Disposed in operating series between the compressors and the turbines is combustor 36. In operating series downstream of low pressure turbine 30 is free operating power turbine 38 from which power output of the engine is taken. Exhaust gas passing through power turbine 38 exits through exhaust system 40. A gas turbine engine system including a plurality of compressors and corresponding turbines is described in more detail in U.S. Pat. No. 3,677,012—Batcha, issued July 18, 1972, and U.S. Pat. No. 3,620,009—Wilde, issued Nov. 16, 1971, the disclosures of which are hereby incorporated herein by reference. The latter patent includes description of a free turbine.

Modification of such relatively complex gas turbine engine system according to the present invention is shown in FIG. 2. In this embodiment, the fluid used to balance the operations of the compressors and turbines is steam generated from a water supply 42. An intercooler 46 is disposed in at least partial engine airflow sequence between low pressure compressor 28 and high pressure compressor 32, and an exhaust heat exchanger 48 disposed in at least partial engine exhaust gas flow sequence in exhaust system 40. Water from water supply 42 is moved through fluid conduit system 43 by a water pumping means, comprised of pump 44 controlled by fluid control 68, in sequence first through intercooler 46 and then through exhaust heat exchanger 48. Steam is generated in exhaust heat exchanger 48, in the desired amount and condition such as superheat, from engine exhaust heat alone or in combination with the heat from one or more supplemental combustors or burners 49 in exhaust system 40. Steam generated from exhaust heat exchanger 48 is in fluid flow sequence, as shown in FIG. 2, with one or more valves effective to cooperate with and assist system control 66 in the control of the flow of steam from exhaust heat exchanger 48 into a selected portion of the engine.

In the embodiment in FIG. 2, fluid conduit system 43 through heat exchanger 48 is in fluid flow relationship with a series of parallel disposed valves, 50, 52, 54, and 56 effective to assist in the control of fluid to the engine positions of combustor 36, high pressure turbine 34, low pressure turbine 30, and power turbine 38, respectively. Provided for such injection of fluid into or in the area of the engine components or positions are a series of fluid introduction means 58, 60, 62, and 64, constructed respectively for fluid introduction into the combustor, high pressure turbine, low pressure turbine, and power turbine. Such mean can be in a variety of forms, for example, ports, orifices, nozzles, etc.

Included in the system is a system control 66 which, among other functions, coordinates the operation of the fluid flow valves such as 50, 52, 54, and 56 as a function of engine operating parameters sensed by system control 66 in the turbine and compressor portions of the engine.

As has been stated, FIG. 2 represents one of the more complex forms of the present invention. It may be desirable to operate a more simplified system, for example, of the type shown in FIG. 1 in an engine of the type shown in FIG. 2. In such an instance, injection of fluid such as steam through valve 52 into high pressure turbine 34 for balancing of the operation of high pressure compressor 32 and high pressure turbine 34 can improve the thermal efficiency of the engine shown.

In operation of the system shown in FIG. 2, water from water supply 42 is passed through intercooler 46 to extract heat from air compressed in low pressure compressor 28. Such extraction of heat increases the temperature of the water passing through intercooler 46 thereby reducing the temperature and volume of air entering high pressure compressor 32. Such a decrease in temperature and volume of the pressurized air passing between low pressure compressor 28 and high pressure compressor 32 enables high pressure compressor 32 to operate more efficiently. In turn, high pressure turbine 34 which drives high pressure compressor 32 can be designed to operate more efficiently in respect to the amount of fuel required to be injected into combustor 36 under selected operating conditions.

Water passing through and heated in intercooler 46 is further pumped, such as by high pressure (for example, equal to compressor discharge pressure) water pump 44, through conduit system 43 into exhaust heat exchanger 48 which is constructed to convert the heated water into steam at the desired heat or superheat condition from the engine exhaust gas alone or in combination with heat from one or more combustors 49. In this regard, system control 66 can be adapted to sense air inlet temperature into low pressure compressor 28 and to adjust the operation of water pump 44 through water control 68, as well as to control any operation of combustors 49. For lower compressor inlet temperatures, less water flow may be required to provide the amount of steam necessary to balance the operation of the turbine and compressor portions of the engine. Under such condition, two coolers can be included: one circulating water to the intercooler such as 46 where the highest temperature water is desired; the other used to obtain lowest compressor air temperature.

Steam generated in the exhaust heat exchanger 48 is directed through one or more of the valves 50, 52, 54, and 56, as necessary for the desired operation of the engine, by system control 66 which senses operating conditions such as pressure ratios in the compressor and turbine portions of the engine.

The decision to include or to provide capability to use one or more of the fluid valves and injection means, in various combinations, according to the present invention is made by the engine designer or the engine modifier according to the intended application of the engine. For example, introduction of steam, such as may be generated by the exhaust system, through valve 50 and steam introduction means 58 into combustor 36 will reduce the pressure ratio ranges in the high pressure turbine 34 and the low pressure turbine 30 resulting in a higher pressure ratio in power turbine 38. Because of the increased mass flow and improved heat and energy transference per unit of flow in the turbine, the work output available from power turbine 38 is much greater than under normal operation.

Figure 3:
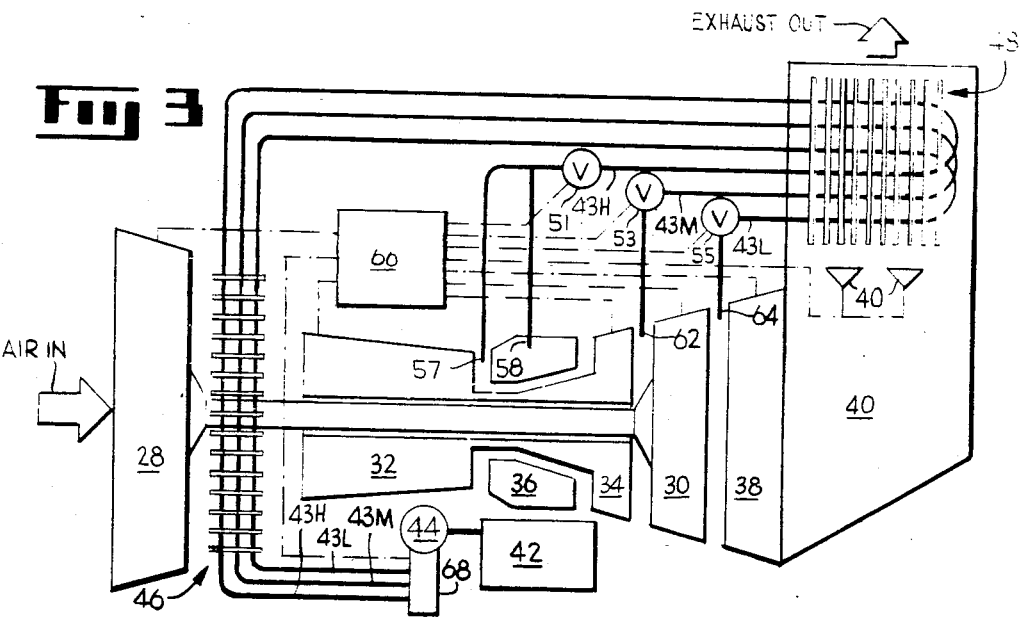
FIG. 3 is a diagrammatic view of another more complex form of the engine and system of the present invention.

FIG. 3, in which like reference numbers identify the same items as in FIG. 2, presents another more complex embodiment of the present invention. In FIG. 3, the fluid conduit system is divided into a plurality of distinct conduits, in this example, high, medium, and low pressure conduits, represented respectively as 43H, 43M, and 43L associated respectively with valves 51, 53, and 55. The pressure in each such conduit of the system is different from the others and is controlled and adjusted by water control 68 at the direction of system control 66, depending upon the area of introduction of steam into the engine as well as the function of such steam in the operation of the engine. For example, such a system particularly as shown in FIG. 3, but also as shown in FIG. 2, can be used both for balancing of engine operation, as described above, as well as for cooling of engine components. In this way, steam under higher pressure can be injected into the engine at 57 upstream of the combustor 36 to cool the combustor as well as other engine internal and downstream components.

In some electrical generation installations, power output may be limited by generator size or electrical energy demand. In such instances, steam can be introduced into the engine at 58 for control of the emissions of oxides of nitrogen, generally referred to as $NO_x$ emissions, and at 62 and 64 to operate the engine at its rated temperature, with reduced airflow for increased steam production and high/peak thermal efficiency at reduced power.

As has been described above, the present invention enables operation of a gas turbine engine at a selected high thermal efficiency range under off-power conditions. However, it should be understood that unlike other proposed steam injection systems, the gas turbine engine associated with the present invention also can be operated without injection of fluid, such as steam. However, when an engine has been designed specifically for steam injection, operation without steam in its designed peak thermal efficiency range generally will result in a power output level lower than when using steam. Under such a condition, a balance may be designed to exist between the flow pressure ratio ranges of the turbine portion and the compressor portion, and no introduction or injection of external fluid is required. Thus, the present invention provides the capability of operating a gas turbine engine system under a variety of selected power output conditions with the gas turbine engine operating consistently at a high level of thermal efficiency. However, any increase in recouped steam flow can be used to increase thermal efficiency even higher.

-continued

| | |
|---|---|
| LBS/HP-HR | pounds per horsepower-hour |

The data of the Table are pesented to show the potential advantage of the present invention, represented by the arrangement with the combination of intercooler and steam injection, over the other arrangements presented. The data presented in the Table for the arrangement and examples of the present invention are under three conditions of steam injection into the combustor area and inlet to the low pressure turbine, with their resultant parameters. As shown by the shaft output horsepower, the arrangements of the preferred form of the present invention, represented by the use of the combination of intercooling and superheated steam injection, can more than double the horsepower of the other arrangements, while increasing the thermal efficiency and reducing the specific fuel consumption of the engine.

The present invention has been described in connection with specific, representative examples and embodiments. However, it will be understood by those skilled in the art that the invention is capable of other examples and embodiments without departing from the scope of the appended claims.

TABLE

CALCULATED DATA
("Standard Day Operation")

| | Standard Base Load | Intercooled Only | Intercooled & Superheated Steam Injection | | Superheated Steam Injection only |
|---|---|---|---|---|---|
| Air Flow (LBS/SEC) | 289 | 345 | 345 | 345 | 289 |
| LPC Exit Temp | 226° F. | 282° F. | 282° F. | 282° F. | 226° F. |
| Intercooler Exit Temp | 226° F. | 80° F. | 80° F. | 80° F. | 226° F. |
| HPC Exit Temp | 1004° F. | 705° F. | 705° F. | 705° F. | 1004° F. |
| HPT Metal Temp | 1615° F. | 1500° F. | 1500° F. | 1600° F. | 1604° F. |
| HPT Pressure Ratio | 4.6 | 3.6 | 2.4 | 2.1 | 4.3 |
| LPT Temp | 1444° F. | 1603° F. | 1725° F. | 1860° F. | 1400° F. |
| LPT Pressure Ratio | 1.44 | 1.56 | 1.4 | 1.36 | 1.44 |
| PT Exit Temp | 830° F. | 800° F. | 800° F. | 850° F. | 750° F. |
| Exhaust Exit Temp | 830° F. | 800° F. | 300° F. | 300° F. | 300° F. |
| Steam (% of Airflow) | — | — | 13% | 15% | 13% |
| Shaft Output HP | 51000 | 80000 | 127000 | 165000 | 66000 |
| Thermal Efficiency LHV (%) | .38% | .41% | .52% | .55% | .45% |
| SFC LBS/HP-HR | .36 | .34 | .266 | .252 | .300 |

The above table presents a calculated data comparison of the engine shown in the system of FIG. 2 in four arrangements; without the intercooler; with the intercooler alone; with the intercooler, the exhaust heat exchanger, and superheated steam injection into the combustor area and the low pressure turbine; and with the exhaust heat exchanger and superheated steam injection into the combustor area and low pressure turbine. The calculations were based on a "standard day operation" which means at an ambient pressure of 14.693 pounds per square inch absolute and a temperature of 518° F.

The meanings of the terms of the table are as follows:

| | |
|---|---|
| LBS/SEC | pounds per second |
| LPC | low pressure compressor |
| HPC | high pressure compressor |
| HPT | high pressure turbine |
| LPT | low pressure turbine |
| PT | power turbine |
| HP | horsepower |
| LHV | low heating value of fuel |
| SFC | specific fuel consumption |

What is claimed is:

1. In a gas turbine engine system comprising a gas turbine engine which includes, in operating series, a compressor, a combustor, and a turbine, the combustor generating a gaseous combustor effluent; a supply of fluid having a specific heat at constant pressure ($C_p$) greater than the $C_p$ of the combustor effleunt; fluid introduction means to introduce the fluid from the supply of fluid into the engine; fluid control means operatively connected with the fluid introduction means to control the introduction of fluid into the engine; and a system control;

the combination wherein:

the engine is designed and constructed to operate without fluid introduction as a gas turbine engine at a preferred thermal efficiency range in a predetermined preferred compressor flow pressure ratio range and in a predetermined preferred turbine flow pressure ratio range; and the system control includes:

(a) compressor sensing means to sense actual compressor operating parameters sufficient to identify the operating compressor flow pressure ratio and to generate a compressor control signal related to the operating compressor flow pressure ratio, (b) turbine sensing means to sense actual turbine operating parameters sufficient to identify the operating turbine flow pressure ratio and to generate a turbine control signal related to the operating turbine flow pressure ratio, and (c) means to transmit the compressor control signal and the turbine control signal to the system control;

the system control futher including means to compare the sensed and transmitted compressor control signal and the turbine control signal with the predetermined compressor and turbine preferred flow pressure ratio ranges, and means to operate the fluid control means to modulate introduction of the fluid into the engine to maintain the operating flow pressure ratios of the compressor and of the turbine in the predetermined preferred ranges.

2. The turbine engine system of claim 1 in which the fluid is steam.

3. The gas turbine engine system of claim 2 in which the steam is in a superheated condition.

4. The gas turbine engine system of claim 2 in which the fluid supply is a water supply, the system further including:

means to extract heat from the engine to convert water from the water supply to steam; and means to supply the steam to the fluid introduction means.

5. The gas turbine engine system of claim 4 in which the compressor comprises multiple stages, the system further including:

an intercooler disposed in at least partial engine airflow sequence between stages of the compressor and adapted to receive water from the water supply;

an exhaust heat exchanger disposed in at least partial engine exhaust gas flow sequence and adapted to receive water from the intercooler; and water pumping means to pump water from the water supply in series first through the intercooler and second to the exhaust heat exchanger to generate the steam, the system control means also including means to sense the steam condition to modulate the flow of water through the intercooler and steam through the exhaust heat exchanger.

6. The gas turbine engine system of claim 5 which includes a supplemental combustor positioned to provide additional heat to the exhaust heat exchanger, the system control means also controlling operation of the supplemental combustor to generate a selected amount and condition of steam in the exhaust heat exchanger responsive to the sensed steam condition.

7. The gas turbine engine system of claim 1 comprising:

(a) a gas turbine engine which includes, in operating series, a low pressure compressor, a high pressure compressor, a combustor, a high pressure turbine, a low pressure turbine, and an exhaust system, the low pressure compressor being operatively connected with the low pressure turbine and the high pressure turbine compressor being operatively connected with the high pressure turbine;

(b) a water supply;

(c) an intercooler adapted to receive and heat water from the water supply in at least partial airflow sequence between the low pressure compressor and the high pressure compressor;

(d) an exhaust heat exchanger adapted to generate steam from the water heated in the intercooler and in at least partial engine exhaust gas flow sequence in the exhaust system;

(e) a fluid conduit system;

(f) water pumping means connected with the fluid conduit system to pump water from the water supply through the conduit system in sequence first through the intercooler to heat the water and to cool and reduce the volume and temperature of low pressure compressor discharge air, and second through the exhaust heat exchanger to extract heat from engine exhaust gas and to generate steam from the water;

(g) steam introduction means connected with the fluid conduit system to introduce steam from the exhaust heat exchanger into at least one of the high pressure turbine and the low pressure turbine to mix with the combustor effluent providing a turbine operating medium; and (h) a system control; the combination wherein:

the engine is designed and constructed to operate without fluid introduction as a gas turbine engine at a preferred thermal efficiency range in a predetermined high pressure compressor flow pressure ratio range and predetermined flow pressure ratio ranges for the high pressure turbine and the low pressure turbine;

the fluid conduit system is connected in sequence from the water supply through the intercooler to heat the water, through the exhaust heat exchanger to generate the steam, and to steam introduction means;

the system control includes:

(a) high pressure compressor sensing means to sense actual high pressure compressor operating parameters sufficient to identify the operating high pressure compressor flow pressure ratio and to generate a high pressure compressor control signal related to the operating high pressure compressor flow pressure ratio;

(b) turbine sensing means to sense actual high pressure and low pressure turbine operating parameters sufficient to identify the operating high pressure and low pressure turbine flow pressure ratios and to generate a high pressure turbine control signal and a low pressure turbine control signal related, respectively, to the operating high pressure and low pressure turbine flow pressure ratios; and (c) means to transmit the compressor control signal and the turbine control signals to the system control;

the system control further including means to compare the sensed and transmitted compressor control signal and the turbine control signals with the predetermined compressor and turbine preferred flow pressure ratio ranges, and means to operate the water pumping means and the steam introduction means to modulate the water flow through the intercooler and the introduction of the steam into the engine to maintain the operating flow pressure ratios of the high pressure compressor and of the turbine in the predetermined preferred ranges.

8. The gas turbine engine system of claim 7 which includes a supplemental combustor positioned in the exhaust system to provide additional heat to the exhaust heat exchanger, the system control means also controlling operation of the supplemental combustor to generate a selected amount and condition of steam in the exhaust heat exchanger.

9. The system of claim 7 in which:

the gas turbine engine includes an independent power turbine in operating series between the low pressure turbine and the exhaust system; and the steam introduction means includes means to introduce the steam into at least one of the high pressure turbine, the low pressure turbine, and the power turbine.

10. The system of claim 7 in which:

the steam introduction means includes means to introduce the steam into at least one of the combustor, the high pressure turbine, and the low pressure turbine.

11. The system of claim 7 in which:

the steam introduction means is constructed to introduce steam into a plurality of engine positions; and the fluid conduit system is comprised of a plurality of distinct conduits each under pressure different from the others.

12. The turbine engine system of claim 2 in which the fluid introduction means is constructed to introduce the steam into the combustor at a first pressure and the turbine at a second pressure different than the first pressure.

* * * * *